US010606263B2

(12) United States Patent
Harda et al.

(10) Patent No.: US 10,606,263 B2
(45) Date of Patent: Mar. 31, 2020

(54) HANDOVER NOTIFICATION ARRANGEMENT, A VEHICLE AND A METHOD OF PROVIDING A HANDOVER NOTIFICATION

(71) Applicant: VOLVO CAR CORPORATION, Gothenburg (SE)

(72) Inventors: Peter Harda, Torslanda (SE); Per Jessen, Copenhagen (DK); Joakim Christoffersson, Malmo (SE)

(73) Assignee: VOLVO CAR CORPORATION, Gothenburg (SE)

( * ) Notice: Subject to any disclaimer, the term of this patent is extended or adjusted under 35 U.S.C. 154(b) by 8 days.

(21) Appl. No.: 15/483,181

(22) Filed: Apr. 10, 2017

(65) Prior Publication Data
US 2017/0300052 A1 Oct. 19, 2017

(30) Foreign Application Priority Data

Apr. 15, 2016 (EP) ..................................... 16165534

(51) Int. Cl.
*G05D 1/00* (2006.01)
*B60W 50/14* (2020.01)
*B60W 40/04* (2006.01)

(52) U.S. Cl.
CPC .......... *G05D 1/0061* (2013.01); *B60W 40/04* (2013.01); *B60W 50/14* (2013.01);
(Continued)

(58) Field of Classification Search
CPC combination set(s) only.
See application file for complete search history.

(56) References Cited

U.S. PATENT DOCUMENTS 5,774,069 A 6/1998 Tanaka et al.
9,919,716 B2 * 3/2018 Christensen ........ B60W 50/082
(Continued)

FOREIGN PATENT DOCUMENTS

EP 2916190 9/2015

OTHER PUBLICATIONS

Extented European Search Report for European Application No. EP 16165534.5, Completed by the European Patent Office, dated Sep. 30, 2016, 5 Pages.

*Primary Examiner* — Adam D Tissot
*Assistant Examiner* — Edward J Pipala
(74) *Attorney, Agent, or Firm* — Brooks Kushman P.C.

(57) ABSTRACT

A handover notification arrangement is configured to provide a handover notification in a driver environment of a vehicle having autonomous driving capabilities. The handover notification arrangement includes a road information arrangement configured to acquire road information representative of an upcoming road section at which the autonomous driving is likely to become at least partially disabled. The handover notification arrangement further includes a processing unit configured to calculate an estimated time available for autonomous driving and configured to calculate an uncertainty estimate of the estimated time available for autonomous driving. The handover notification arrangement is configured to cause the output unit to provide the handover notification such that the handover notification is provided earlier in cases of high uncertainty estimates than in cases of low uncertainty estimates. The present disclosure also describes a vehicle and a method of providing a handover notification.

14 Claims, 4 Drawing Sheets

(52) U.S. Cl.
CPC ... *B60W 2050/146* (2013.01); *B60W 2550/20* (2013.01); *B60W 2550/22* (2013.01); *B60W 2550/402* (2013.01)

(56) References Cited

U.S. PATENT DOCUMENTS

| | | | |
|---|---|---|---|
| 2007/0106465 A1* | 5/2007 | Adam | G01C 21/3492 |
| | | | 701/533 |
| 2015/0094899 A1 | 4/2015 | Hackenberg et al. | |
| 2017/0229014 A1* | 8/2017 | Bradai | G08G 1/096725 |
| 2018/0037223 A1* | 2/2018 | Goto | B60W 30/08 |
| 2018/0052458 A1* | 2/2018 | Tsuji | G05D 1/0061 |
| 2018/0088574 A1* | 3/2018 | Latotzki | G05D 1/0061 |

* cited by examiner

HANDOVER NOTIFICATION ARRANGEMENT, A VEHICLE AND A METHOD OF PROVIDING A HANDOVER NOTIFICATION

CROSS-REFERENCE TO RELATED APPLICATIONS

This application claims foreign priority benefits under 35 U.S.C. § 119(a)-(d) to European patent application number EP 16165534.5, filed Apr. 15, 2016, which is incorporated by reference in its entirety.

TECHNICAL FIELD

The present disclosure relates to a handover notification arrangement configured to provide a handover notification in a driver environment of a vehicle having autonomous driving capabilities, a vehicle, and a method of providing a handover notification in a driver environment of a vehicle.

BACKGROUND

Vehicles, in particular cars or trucks for road traffic, are increasingly equipped with driver assistance systems that allow for the vehicle to be driven automatically in road traffic, which often is referred to as autonomous driving. This is enabled through the use of remote sensors arranged to acquire vehicle surrounding information to allow control of steering, and/or control of velocity on the basis thereof. During autonomous driving, an occupant of the vehicle is able to devote himself at least partially to other activities. However, no autonomous vehicle control arrangements are available today which are fully capable of performing autonomous driving in all situations, and at all road sections. Therefore, when the autonomous vehicle control arrangement recognizes an upcoming road section where the arrangement will likely become at least partially unable to perform the autonomous driving, the arrangement asks the occupant to take over control of the vehicle.

Attempts have been made to provide a driver assistance system that is able to output information in order to return the responsibility for driving to an occupant at the end of a roadway section drivable by an autopilot function. For example, the document US2015094899A1 relates to a driver assistance system of a vehicle where the driver assistance system is able to control the vehicle at least partially automatically, a method alerts the driver to retake control of the vehicle from the driver assistance system based on the distance between the current location of the vehicle and an end of the autopilot capable route section. An end of an autopilot route section in a route planned for the vehicle is determined and distance information is determined between a current position of the vehicle and the end of the autopilot route section. The distance information is compared to a first and a second threshold value, and a first or a second indication is output as a function thereof.

The taking over of control of the vehicle is often referred to as a handover. For safety reasons, such a handover may be performed prior to reaching an upcoming road section at which the autonomous vehicle control arrangement is likely to become at least partially unable to perform the autonomous driving of the vehicle. Since the occupant of the vehicle may be engaged with other activities than focusing on the road, a handover notification may be provided sufficiently early to allow the occupant to have sufficient time to prepare for manual driving of the vehicle. Still, if the handover notification is provided too early, it may distract and annoy the occupant, which may lead to an impaired trust and confidence of the handover notification. An occupant may, as a result thereof, return to the other activities. Thus, from a safety perspective, it may be desired to provide the handover notification at an appropriate time prior to reaching the upcoming road section. However, in some driving situations, it is difficult to predict the time available for autonomous driving, due to unpredictability of the traffic flow up to the upcoming road section.

In view of the above, there is a need for an arrangement capable of providing an improved handover notification.

SUMMARY

An object of the present disclosure is to provide an improved handover notification.

According to an embodiment of the disclosure, the object is achieved by a handover notification arrangement configured to provide a handover notification in a driver environment of a vehicle having autonomous driving capabilities by means of an autonomous vehicle control arrangement, where the handover notification constitutes a notification concerning an upcoming handover from an autonomous driving mode to a manual driving mode of the vehicle, where the arrangement comprises an output unit configured to selectively provide the handover notification, a positioning arrangement arranged to provide map data representative of at least a road section in front of the vehicle, and a current position of the vehicle, a road information arrangement configured to acquire road information representative of an upcoming road section at which the autonomous vehicle control arrangement is likely to become at least partially unable to perform the autonomous driving of the vehicle, and configured to acquire road condition information representative of a road condition at the road section, a processing unit configured to calculate an estimated average speed on the road section based on the road condition information, and further configured to calculate an estimated time available for autonomous driving based on the estimated average speed and a remaining distance from the current position of the vehicle to the upcoming road section, wherein the processing unit further is configured to calculate an uncertainty estimate of the estimated time available for autonomous driving based on the estimated average speed, such that the uncertainty estimate increases for low estimated average speeds, and where the handover notification arrangement is configured to cause the output unit to provide the handover notification in dependence of the uncertainty estimate, such that the handover notification is provided earlier in cases of high uncertainty estimates than in cases of low uncertainty estimates.

In cases of high uncertainty estimates, it is a higher probability that an actual time available for autonomous driving is less than the estimated time available for autonomous driving. Since the handover notification is provided earlier in cases of high uncertainty estimates, it is ensured that the handover notification is provided sufficiently early, even in such cases, to allow an occupant of the vehicle to have sufficient time to prepare for manual driving.

In cases of low uncertainty estimates, it is a higher probability that the actual time available for autonomous driving essentially corresponds to the estimated time available for autonomous driving. The handover notification will be provided later in cases of low uncertainty estimates. Thereby, it is ensured that the handover notification not is provided unjustifiably early in such cases.

Thus, a timing of the handover notification is improved. Accordingly, an improved handover notification is provided. Thus, the above mentioned object is achieved.

Optionally, the road condition information further comprises at least one of a level of congestion at the road section, average speeds of vehicles travelling on the road section, historic average speeds of vehicles having travelled on the road section and speed limits at the road section. Thereby, a more accurate estimated average speed on the road section can be calculated, and thus also a more accurate estimated time available for autonomous driving and more accurate uncertainty estimates. Thereby, the timing of the handover notification is further improved. As a result, an even further improved handover notification is provided.

Optionally, the road condition information further comprises average speeds of vehicles travelling on the road section and speed limits at the road section, wherein the processing unit further is configured to calculate the uncertainty estimate based on a comparison between the average speeds of vehicles travelling on the road section, and speed limits at the road section, such that the uncertainty estimate increases for low average speeds of vehicles travelling on the road section, compared to speed limits at the road section. Thereby, a more accurate estimated average speed on the road section can be calculated, and thus also a more accurate estimated time available for autonomous driving and more accurate uncertainty estimates. Thereby, the timing of the handover notification is further improved. As a result, an even further improved handover notification is provided.

Optionally, the output unit is configured to, in case the uncertainty estimate is below a predetermined threshold value, provide the handover notification by outputting the estimated time available for autonomous driving, and in case the uncertainty estimate is above the predetermined threshold value, provide the handover notification by outputting a static approximate time to reaching the upcoming road section based on the estimated time available for autonomous driving and the uncertainty estimate. In cases of high uncertainty estimates, i.e. in cases where the uncertainty estimate is above the predetermined threshold value, it is a higher probability that the estimated time available for autonomous driving significantly differs from an actual estimated time available for autonomous driving. By providing the handover notification by outputting a static approximate time to reaching the upcoming road section, instead of the estimated time available for autonomous driving, if the uncertainty estimate is above the predetermined threshold value, an occupant in the driver environment of the vehicle will not be confused, or misled, by the outputting of an incorrect, and/or varying, estimated time available for autonomous driving.

In cases of low uncertainty estimates, i.e. in cases where the uncertainty estimate is below the predetermined threshold value, it is a higher probability that the estimated time available for autonomous driving essentially corresponds to an actual time available for autonomous driving. Thereby, the handover notification can be provided by outputting the estimated time available for autonomous driving with a good reliability.

As a result, an even further improved handover notification is provided.

Optionally, the output unit is configured to, in case the uncertainty estimate is below a predetermined threshold value, provide the handover notification by outputting the estimated time available for autonomous driving, and in case the uncertainty estimate is above the predetermined threshold value, provide the handover notification by outputting the remaining distance to the upcoming road section. In cases of high uncertainty estimates, i.e. in cases where the uncertainty estimate is above the predetermined threshold value, it is a higher probability that the estimated time available for autonomous driving significantly differs from an actual estimated time available for autonomous driving. By providing the handover notification by outputting the remaining distance to the upcoming road section, if the uncertainty estimate is above the predetermined threshold value, an occupant in the driver environment of the vehicle will not be confused, or misled, by the outputting of an incorrect and/or varying estimated time available for autonomous driving.

In cases of low uncertainty estimates, i.e. in cases where the uncertainty estimate is below the predetermined threshold value, it is a higher probability that the estimated time available for autonomous driving corresponds to an actual estimated time available for autonomous driving. Thereby, the handover notification can be provided by outputting the estimated time available for autonomous driving with a good reliability.

As a result, an even further improved handover notification is provided.

Optionally, the output unit comprises a display unit configured to provide the handover notification by performing a switch of displayed content on the display unit. Thereby, the handover notification is provided in a clear and unambiguous manner. As a result, an even further improved handover notification is provided.

Further embodiments herein aim to provide a vehicle comprising a handover notification arrangement according to some embodiments.

Further embodiments herein aim to provide a method of providing a handover notification in a driver environment of a vehicle having autonomous driving capabilities by means of an autonomous vehicle control arrangement, where the handover notification constitutes a notification concerning an upcoming handover from an autonomous driving mode to a manual driving mode of the vehicle, using a handover notification arrangement comprising an output unit configured to selectively provide the handover notification, a positioning arrangement, a road information arrangement and a processing unit, wherein the method comprises:

providing map data representative of at least a road section in front of the vehicle and a current position of the vehicle, using the positioning arrangement, acquiring road information representative of an upcoming road section at which the autonomous vehicle control arrangement is likely to become at least partially unable to perform the autonomous driving of the vehicle, and acquiring road condition information representative of a road condition at the road section, using the road information arrangement, calculating an estimated average speed on the road section based on the road condition information, using the processing unit, calculating an estimated time available for autonomous driving based on the estimated average speed and a remaining distance from the current position of the vehicle to the upcoming road section, using the processing unit, calculating an uncertainty estimate of the estimated time available for autonomous driving based on the estimated average speed such that the uncertainty estimate increases for low estimated average speeds, using the processing unit, causing the output unit to provide the handover notification in dependence of the uncertainty estimate, such that the handover notification is provided earlier in cases of high uncertainty estimates than in cases of low uncertainty estimates, using the handover notification arrangement.

In cases of high uncertainty estimates, it is a higher probability that an actual time available for autonomous driving is less than the estimated time available for autonomous driving. Since the handover notification is provided earlier in cases of high uncertainty estimates, it is ensured that the handover notification is provided sufficiently early, even in such cases.

In cases of low uncertainty estimates, it is a higher probability that the actual time available for autonomous driving essentially corresponds to the estimated time available for autonomous driving. The handover notification will be provided later in cases of low uncertainty estimates. Thereby, it is ensured that the handover notification not is provided unjustifiably early in such cases.

Thus, a method is provided with improved timing of a handover notification. Accordingly, an improved handover notification is provided. Thus, the above mentioned object is achieved.

Optionally, the road condition information further comprises average speeds of vehicles travelling on the road section and speed limits at the road section, wherein the method further comprises:

calculating the uncertainty estimate based on a comparison between the average speeds of vehicles travelling on the road section, and speed limits at the road section, such that the uncertainty estimate increases for low average speeds of vehicles travelling on the road section compared to speed limits at the road section, using the processing unit.

Thereby, a method is provided which more accurately calculates the estimated average speed on the road section, and thus also a more accurate estimated time available for autonomous driving and more accurate uncertainty estimates. Thereby, the timing of the handover notification is further improved. As a result, an even further improved handover notification is provided.

Optionally, the method further comprises:
providing the handover notification by outputting the estimated time available for autonomous driving, in case the uncertainty estimate is below a predetermined threshold value, and providing the handover notification by outputting a static approximate time to reaching the upcoming road section based on the estimated time available for autonomous driving and the uncertainty estimate, in case the uncertainty estimate is above the predetermined threshold value, using the output unit.

In cases of high uncertainty estimates, i.e. in cases where the uncertainty estimate is above the predetermined threshold value, it is a higher probability that the estimated time available for autonomous driving significantly differs from an actual estimated time available for autonomous driving. By providing the handover notification by outputting a static approximate time to reaching the upcoming road section, instead of the estimated time available for autonomous driving, if the uncertainty estimate is above the predetermined threshold value, an occupant in the driver environment of the vehicle will not be confused, or misled, by the outputting of an incorrect, and/or varying, estimated time available for autonomous driving.

In cases of low uncertainty estimates, i.e. in cases where the uncertainty estimate is below the predetermined threshold value, it is a higher probability that the estimated time available for autonomous driving corresponds to an actual estimated time available for autonomous driving. Thereby, the handover notification can be provided by outputting the estimated time available for autonomous driving with a good reliability.

As a result, an even further improved handover notification is provided.

Optionally, the method further comprises:
providing the handover notification by outputting the estimated time available for autonomous driving, in case the uncertainty estimate is below a predetermined threshold value, and providing the handover notification by outputting the remaining distance to the upcoming road section, in case the uncertainty estimate is above the predetermined threshold value, using the output unit.

In cases of high uncertainty estimates, i.e. in cases where the uncertainty estimate is above the predetermined threshold value, it is a higher probability that the estimated time available for autonomous driving significantly differs from an actual estimated time available for autonomous driving. By providing the handover notification by outputting the remaining distance to the upcoming road section, if the uncertainty estimate is above the predetermined threshold value, an occupant in the driver environment of the vehicle will not be confused, or misled, by the outputting of an incorrect and/or varying estimated time available for autonomous driving.

In cases of low uncertainty estimates, i.e. in cases where the uncertainty estimate is below the predetermined threshold value, it is a higher probability that the estimated time available for autonomous driving corresponds to an actual estimated time available for autonomous driving. Thereby, the handover notification can be provided by outputting the estimated time available for autonomous driving with a good reliability.

As a result, an even further improved handover notification is provided.

Optionally, the output unit comprises a display unit, and the method may further comprise:
providing the handover notification by performing a switch of displayed content on the display unit.

Thereby, the handover notification is provided in a clear and unambiguous manner. As a result, an even further improved handover notification is provided.

Further features of, and advantages with, the present disclosure will become apparent when studying the appended claims and the following detailed description. Those skilled in the art will realize that the different features described may be combined to create embodiments other than those described in the following, without departing from the scope of the present disclosure, as defined by the appended claims.

BRIEF DESCRIPTION OF THE DRAWINGS

The various aspects of the disclosure, including its features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings, in which example embodiments are shown. Disclosed features of example embodiments may be combined as readily understood by one of ordinary skill in the art. Like numbers refer to like elements throughout.

Well-known functions or constructions will not necessarily be described in detail for brevity and/or clarity.

Figure 1:
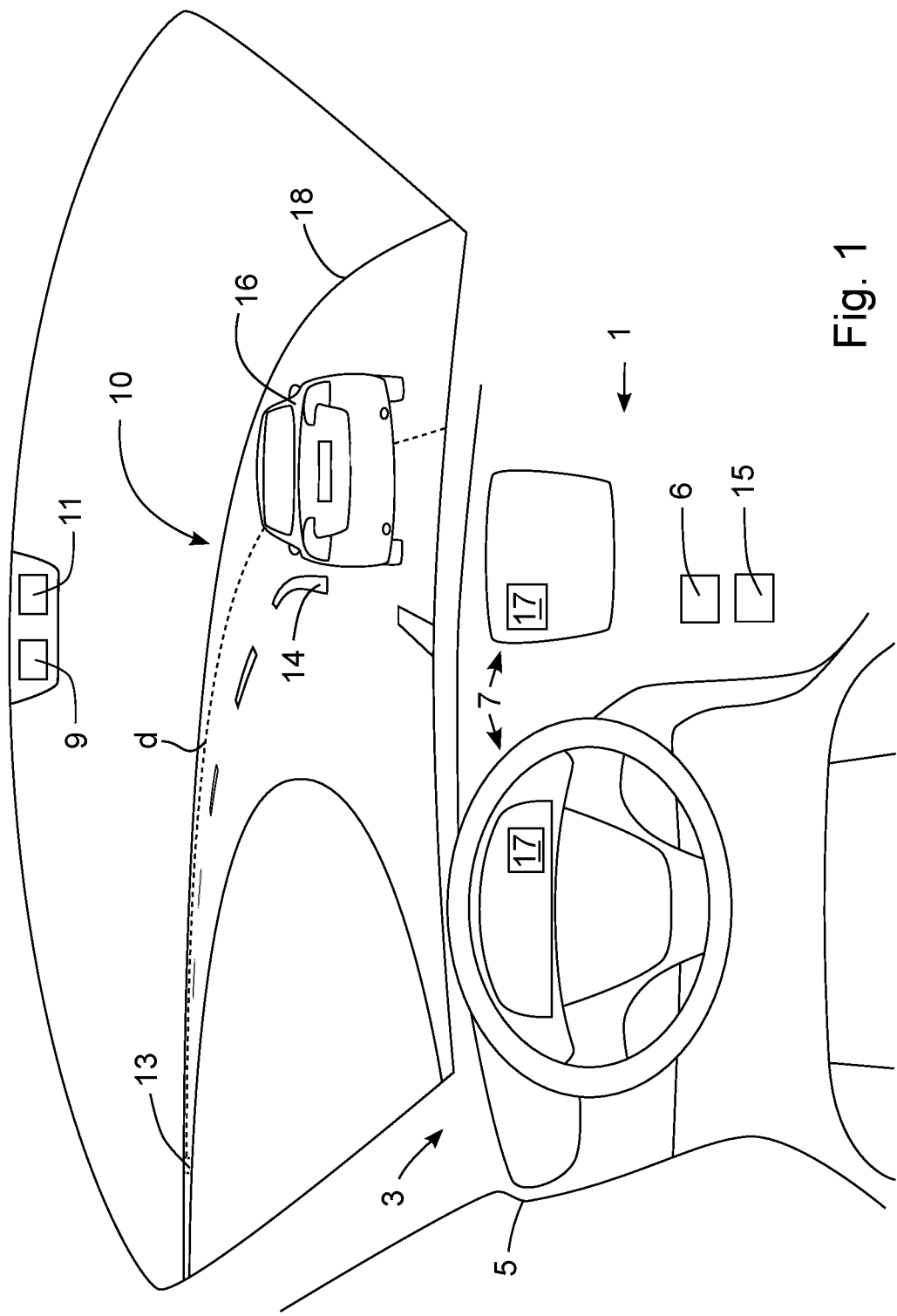
FIG. 1 illustrates a handover notification arrangement.

FIG. 1 illustrates a handover notification arrangement 1 configured to provide a handover notification in a driver environment 3 of a vehicle 5 having autonomous driving capabilities by means of an autonomous vehicle control arrangement 6. The vehicle 5 may be a car, as is illustrated in FIG. 1, or may be another type of road vehicle such as a bus, truck, van or similar. The autonomous vehicle control arrangement 6 comprises remote sensors arranged to acquire vehicle surrounding information. The remote sensors may comprise one or more of a RADAR (RAdio Detection And Ranging) sensor, a LASER (Light Amplification by Stimulated Emission of Radiation) sensor, a LIDAR (Light Detection And Ranging) sensor, and/or an imaging sensor. Further, the remote sensors may comprise a space based satellite navigation system such as a Global Positioning System (GPS), The Russian GLObal NAvigation Satellite System (GLONASS), European Union Galileo positioning system, Chinese Compass navigation system, or Indian Regional Navigational Satellite System and/or other means to provide a current position of the vehicle 5, such as feature based localization based on data from remote sensors.

The autonomous vehicle control arrangement 6 further comprises a steering control unit. The steering control unit is operatively connected to a steering actuator of the vehicle 5 and is arranged to control steering of the vehicle 5, by controlling the steering actuator based on the vehicle surrounding information, acquired by the remote sensors. The autonomous vehicle control arrangement 6 further comprises a velocity control arrangement configured to control velocity of the vehicle 5. The control of velocity of the vehicle 5 may also be based on the vehicle surrounding information acquired by the remote sensors. For the reason of clarity, the features of the autonomous vehicle control arrangement 6 are not illustrated in FIG. 1.

The handover notification arrangement 1 comprises an output unit 7 configured to selectively provide the handover notification. The handover notification constitutes a notification concerning an upcoming handover from an autonomous driving mode to a manual driving mode of the vehicle 5. The output unit 7 may comprise one or more display units 17, as is illustrated in FIG. 1. As an alternative, or in addition, the output unit 7 comprises an audio arrangement, a haptic arrangement, and/or a light arrangement.

The handover notification arrangement 1 further comprises a positioning arrangement 9 arranged to provide map data representative of at least a road section 10 in front of the vehicle 5 and a current position of the vehicle 5. The positioning arrangement 9 may comprise a space based satellite navigation system such as a GPS, GLONASS, European Union Galileo positioning system, Chinese Compass navigation system, or Indian Regional Navigational Satellite System and/or other means to provide a current position of the vehicle 5, such as feature based localization based on data from remote sensors.

The handover notification arrangement 1 further comprises a road information arrangement 11 configured to acquire road information representative of an upcoming road section 13 at which the autonomous vehicle control arrangement 6 is likely to become at least partially unable to perform the autonomous driving of the vehicle 5. The road information arrangement 11 may form part of the positioning arrangement 9 arranged to provide map data. In such embodiments, upcoming road section 13, at which the autonomous vehicle control arrangement 6 is likely to become at least partially unable to perform the autonomous driving of the vehicle 5, may be comprised in the map data. As an alternative, or in addition, the road information arrangement 11 comprises a wireless communication unit configured to acquire the road information from other vehicles 16, and/or from a remote database arranged in a cloud, or a remote server, or similar. The road information arrangement 11 may comprise a road information processing unit configured to process the road information to determine the upcoming road section 13 at which the autonomous vehicle control arrangement 6 is likely to become at least partially unable to perform the autonomous driving of the vehicle 5. Such determining may for example be based on presence of, or absence, of lane markings 14, and/or road boundaries 18, and/or detectability of lane markings 14 and/or road boundaries 18. Further, such determining may be based on presence of a slippery road condition, presence of a bad weather condition, presence of a road work, presence of an accident, and/or presence of one or more obstacles at the road section 10. Still further, the road information may comprise information representative of an upcoming road section 13 at which an autonomous vehicle control arrangement previously has become least partially unable to perform the autonomous driving of a vehicle hosting the autonomous vehicle control arrangement.

The road information arrangement 11 further is configured to acquire road condition information representative of a road condition at the road section 10. The road condition information may comprise information affecting a driving average speed at the road section 10, such as at least one of a level of congestion at the road section 10, average speeds of vehicles 16 travelling on the road section 10, historic average speeds of vehicles having travelled on the road section 10, speed limits at the road section 10, weather condition at the road section 10, current light condition at the road section 10, and presence of roadworks at the road section 10. The road condition information may be acquired wirelessly from other vehicles 16, and/or from a remote database arranged in a cloud, or a remote server, or similar. As an alternative, or in addition, road information arrangement 11 may comprise one or more remote sensors arranged to acquire the road condition information, such as one or more of a RADAR (RAdio Detection And Ranging) sensor, a LASER (Light Amplification by Stimulated Emission of Radiation) sensor, a LIDAR (LIght Detection And Ranging) sensor, and/or an imaging sensor.

The handover notification arrangement 1 further comprises a processing unit 15 configured to calculate an estimated average speed on the road section 10 based on the road condition information. Further, the processing unit 15 is configured to calculate an estimated time available for autonomous driving, based on the estimated average speed, and a remaining distance d from the current position of the vehicle 5, to the upcoming road section 13.

Further, the processing unit 15 is configured to calculate an uncertainty estimate of the estimated time available for autonomous driving, based on the estimated average speed, such that the uncertainty estimate increases for low estimated average speeds, and decreases for high estimated average speeds. The handover notification arrangement 1 is configured to cause the output unit 7 to provide the handover notification, in dependence of the uncertainty estimate, such that the handover notification is provided earlier in cases of high uncertainty estimates, than in cases of low uncertainty estimates. Thereby, the handover notification is provided sufficiently early, even in cases where the probability is higher that an actual time available for autonomous driving is less than the estimated time available for autonomous driving. The processing unit 15 may be configured to calculate the uncertainty estimate using an algorithm, and/or by using a look-up-table.

Figure 2:
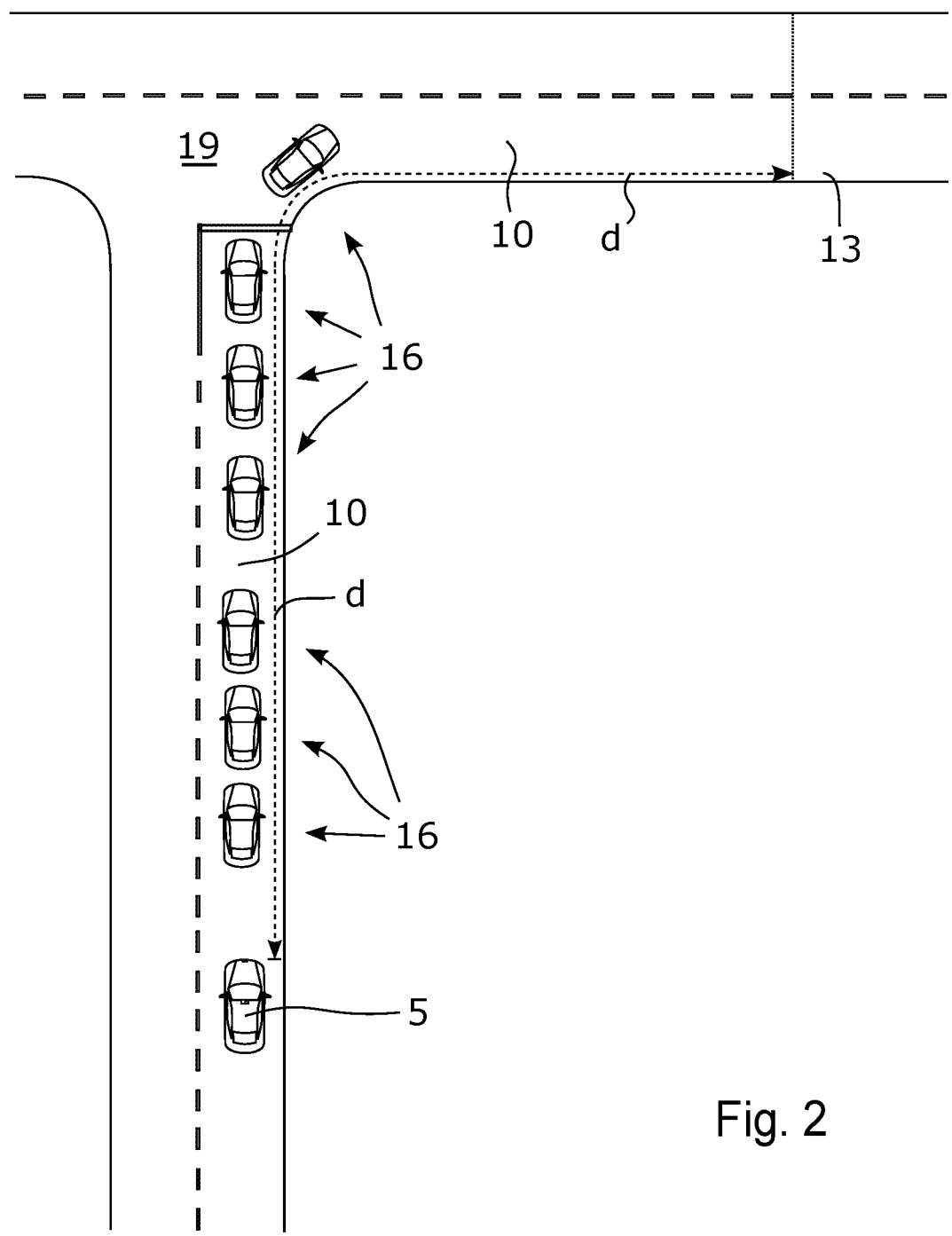
FIG. 2 illustrates a vehicle comprising the handover notification arrangement.

FIG. 2 illustrates a vehicle 5 comprising a handover notification arrangement according to some embodiments. In FIG. 2, the road section 10 in front of the vehicle 5 is illustrated as having a high level of congestion up to an intersection 19. After the intersection 19, the level of congestion is low. FIG. 2 further illustrates an upcoming road section 13, at which the autonomous vehicle control arrangement of the vehicle 5 is likely to become at least partially unable to perform the autonomous driving of the vehicle 5, as well as the distance d from the current position of the vehicle 5, to the upcoming road section 13.

In embodiments wherein the road condition information comprises a level of congestion at the road section 10, the processing unit may be configured to calculate the uncertainty estimate such that the uncertainty estimate increases for high levels of congestion at the road section 10, and decreases for low levels of congestion at the road section 10. The uncertainty of the estimated time available for autonomous driving is greater in cases of high levels of congestion, than in cases of low levels of congestion, partly since the high level of congestion at the road section 10 may be caused by a temporary traffic stop, which may dissolve, as is illustrated in FIG. 2. Since the processing unit, in these embodiments is configured to calculate the uncertainty estimate such that the uncertainty estimate increases for high levels of congestion, the handover notification will be provided sufficiently early, to allow an occupant of the vehicle 5 to have sufficient time to prepare for manual driving. A prior art handover notification arrangement, being configured to provide the handover notification solely in dependence of an estimated time available for autonomous driving, would risk to provide the handover notification too late in the situation illustrated in FIG. 2.

In embodiments wherein the road condition information comprises average speeds of vehicles 16 travelling on the road section 10, the processing unit may be configured to calculate the uncertainty estimate such that the uncertainty estimate increases for low average speeds of vehicles 16 travelling on the road section 10, and decreases for high average speeds of vehicles 16 travelling on the road section 10. This since low average speeds of vehicles 16 travelling on the road section 10 may be caused by a temporary traffic stop, which may dissolve, as is illustrated in FIG. 2. Since the processing unit in these embodiments is configured to calculate the uncertainty estimate such that the uncertainty estimate increases for low average speeds of vehicles 16, the handover notification will be provided sufficiently early, even in such cases, to allow an occupant of the vehicle 5 to have sufficient time to prepare for manual driving.

According to some embodiments, the road condition information further comprises average speeds of vehicles 16 travelling on the road section 10 and speed limits at the road section 10. In such embodiments, the processing unit may be configured to calculate the uncertainty estimate based on a comparison between the average speeds of vehicles 16 travelling on the road section 10, and speed limits at the road section 10, such that the uncertainty estimate increases for low average speeds of vehicles 16 travelling on the road section 10, compared to speed limits at the road section 10, and decreases for high average speeds of vehicles 16 travelling on the road section 10, compared to speed limits at the road section 10. As indicated above, low average speeds of vehicles 16 may be caused by a temporary traffic stop, which may dissolve. That is, the risk that the low average speeds of vehicles are caused by a traffic stop, which is temporary, is greater in case there is a high speed limit at the road section 10, than if there is a low speed limit at the road section 10. By comparing average speeds of vehicles with speed limits at the road section 10, such a situation is better identified, and the handover notification will be provided sufficiently early to allow an occupant of the vehicle 5 to have sufficient time to prepare for manual driving.

In embodiments wherein the road condition information comprises a weather condition at the road section 10, and/or a current light condition at the road section 10, the processing unit may be configured to calculate the uncertainty estimate such that the uncertainty estimate increases for bad weather conditions and/or poor light conditions on the road section 10, and decreases for good weather conditions and/or good light conditions on the road section 10. This since the uncertainty of the estimated time available for autonomous driving is greater in cases of bad weather conditions and poor light conditions.

In embodiments wherein the road condition information comprises presence of roadworks at the road section 10, the processing unit may be configured to calculate the uncertainty estimate such that the uncertainty estimate increases in case of presence of a roadwork at the road section 10. This since the uncertainty of the estimated time available for autonomous driving is greater in case of a roadwork at the road section 10.

According to some embodiments, the processing unit is configured to calculate the uncertainty estimate such that the uncertainty estimate increases for shorter remaining distances d to the upcoming road section 13, and decreases for longer remaining distances d to the upcoming road section 13. This since the uncertainty of the estimated time available for autonomous driving is greater in case of shorter remaining distances d, than in case of longer remaining distances d.

The processing unit may be configured to set a notification time threshold value in dependence of the uncertainty estimate such that the notification time threshold value increases for high uncertainty estimates and decreases for low uncertainty estimates, where the handover notification arrangement 1 is configured to cause the output unit 7 to provide the handover notification when the estimated time available for autonomous driving falls below the notification time threshold value. The notification time threshold value may comprise a minimum notification time in which the handover notification arrangement 1 causes the output unit 7 to provide the handover notification. Purely as an example, such minimum notification time may be 1 minute. Further, the notification time threshold value may comprise a maximum notification time in which the handover notification arrangement 1 causes the output unit 7 to provide the handover notification. Purely as an example, such maximum notification time may be 5 minutes.

As an alternative, or in addition, the processing unit is configured to set a notification distance in dependence of the uncertainty estimate such that the notification distance increases for high uncertainty estimates, and decreases for low uncertainty estimates, where the handover notification arrangement 1 is configured to cause the output unit 7 to provide the handover notification when the remaining distance d to the upcoming road section 13 falls below the notification distance. The notification distance may comprise a minimum notification distance in which the handover notification arrangement 1 causes the output unit 7 to provide the handover notification. Purely as an example, such minimum notification distance may be 400 meters. Further, the notification distance may comprise a maximum notification distance representative of a maximum distance to the upcoming road section 12 at which the handover notification arrangement 1 causes the output unit 7 to provide the handover notification. Purely as an example, such maximum notification distance may be 4 km ahead of the upcoming road section 13.

In order to further point out the advantages of the handover notification arrangement 1, according to embodiments herein, two example traffic situations are given below.

EXAMPLE 1

Low level of congestion and a speed limit of 70 km/h at the road section 10 in front of the vehicle 5. Such a situation is illustrated in FIG. 1.

The road condition information, acquired by the road information arrangement 11, indicates an average speed of 70 km/h. Since the average speed is very close to the speed limit, the uncertainty estimate is low. Therefore, the minimum notification time of 1 minute can be applied, and the handover notification will be provided 1.2 km ahead of the upcoming road section 13.

EXAMPLE 2

High level of congestion and a speed limit of 70 km/h at the road section 10 in front of the vehicle 5. Such a situation is illustrated in FIG. 2.

The road condition information, acquired by the road information arrangement 11, indicates an average speed of 8 km/h. If the uncertainty would be estimated as low, and if the minimum notification time would be applied, the handover notification would be provided only 130 metres from the upcoming road section 13. However, since the handover arrangement 1 is configured in accordance with the embodiments herein, the uncertainty estimate will be high, and the handover notification will be provided 400 m ahead of the upcoming road section 13, corresponding to 3 minutes prior to reaching the upcoming road section 13

Figure 3A:
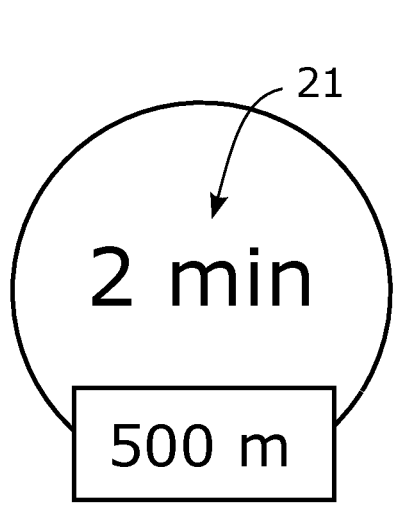
FIG. 3a-3d each illustrates a display unit of the handover notification arrangement.
Figure 3B:
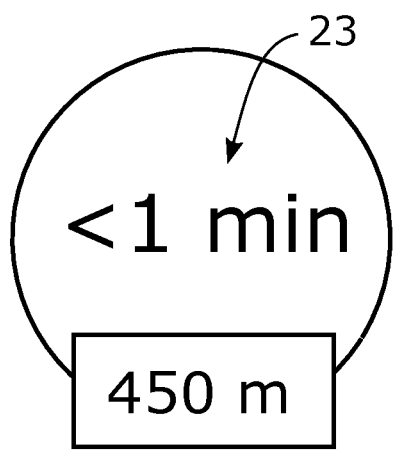

FIG. 3a-3d each illustrates a display unit 17 of the output unit 7 of the handover notification arrangement 1, illustrated in FIG. 1. In the embodiments illustrated in FIGS. 3a and 3b, the output unit 7 is configured to, in case the uncertainty estimate is below a predetermined threshold value, provide the handover notification by outputting the estimated time available for autonomous driving 21. The estimated time available for autonomous driving 21 is exemplified in FIG. 3a by the text "2 min". In these embodiments, the output unit 7 further is configured to, in case the uncertainty estimate is above the predetermined threshold value, provide the handover notification by outputting a static approximate time 23 to reaching the upcoming road section 13, based on the estimated time available for autonomous driving and the uncertainty estimate. The static approximate time 23 is exemplified in FIG. 3b by the text "<1 min". By providing the handover notification by outputting the static approximate time 23 to reaching the upcoming road section, instead of the estimated time available for autonomous driving 21, if the uncertainty estimate is above the predetermined threshold value, the occupant of the vehicle will not be confused, or misled, by the outputting of an incorrect, and/or varying, estimated time available for autonomous driving 21. Further, as is illustrated in FIG. 3b, the outputting of the static approximate time 23 may be supplemented by an outputting of the remaining distance 25 to the upcoming road section 13.

In the embodiments illustrated in FIGS. 3c and 3d, the output unit 7 is configured to, in case the uncertainty estimate is below the predetermined threshold value, provide the handover notification by outputting the estimated time available for autonomous driving 21, illustrated in FIG. 3c, and in case the uncertainty estimate is above the predetermined threshold value, provide the handover notification by outputting the remaining distance 25 to the upcoming road section 13. The remaining distance 25 is exemplified in FIG. 3d by the text "450 m". By providing the handover notification by outputting the remaining distance 25 to the upcoming road section, if the uncertainty estimate is above the predetermined threshold value, the occupant in the vehicle will not be confused, or misled, by the outputting of an incorrect and/or varying estimated time available for autonomous driving 21. Further, as is illustrated in FIG. 3d, the outputting of remaining distance 25 may be supplemented by the outputting of the static approximate time 23

According to some embodiments, the display unit 17 is configured to provide the handover notification by performing a switch of displayed content on the display unit 17. The switch may encompass a switch from a displaying of the estimated time available for autonomous driving 21 and the remaining distance 25 to the upcoming road section, as is illustrated in FIG. 3a, to a displaying of the static approximate time 23 possibly supplemented by the remaining distance 25, as is illustrated in FIG. 3b. Such a switch is illustrated with an arrow 20.

Figure 3C:
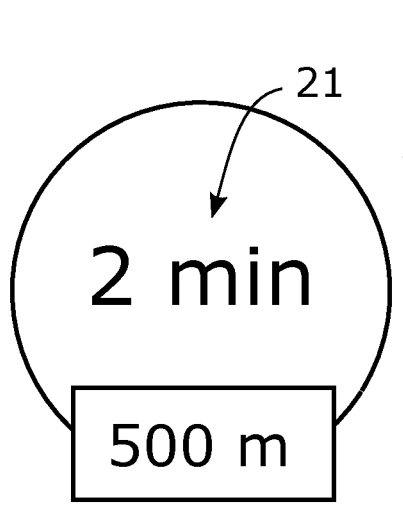
Figure 3D:
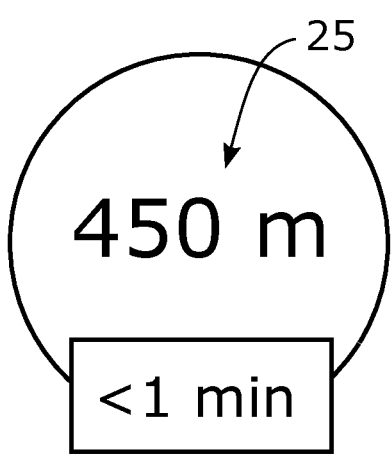

According to further embodiments, the switch encompasses a switch from a displaying of the estimated time available for autonomous driving 21 and the remaining distance 25 to the upcoming road section, as is illustrated in FIG. 3c, to a displaying of the remaining distance 25, possibly supplemented by the static approximate time 23, as is illustrated in FIG. 3d.

Those skilled in the art will appreciate that the handover notification arrangement 1, autonomous vehicle control arrangement 6, output unit 7, positioning arrangement 9, road information arrangement 11, processing unit 15, display unit 17, and/or any other arrangement, unit, system, device or module described herein may comprise, in whole or in part, a combination of analog and digital circuits and/or one or more appropriately programmed processors (e.g., one or more microprocessors including central processing units (CPU)) and associated memory, which may include stored operating system software, firmware and/or application software executable by the processor(s) for controlling operation thereof and/or for performing the particular algorithms represented by the various functions and/or operations described herein, including interaction between and/or cooperation with each other. One or more of such processors, as well as other digital hardware, may be included in a single ASIC (Application-Specific Integrated Circuitry), or several processors and various digital hardware may be distributed among several separate components, whether individually packaged or assembled into a SoC (System-on-a-Chip).

Furthermore, the handover notification arrangement 1, autonomous vehicle control arrangement 6, output unit 7, positioning arrangement 9, road information arrangement 11, processing unit 15, display unit 17, and/or any other arrangement, unit, system, device or module described herein may for instance be implemented in one or several arbitrary nodes comprised in the host vehicle. In that regard, such a node may comprise an electronic control unit (ECU) or any suitable electronic device, which may be a main or central node. It should also be noted that the handover notification arrangement 1, autonomous vehicle control arrangement 6, output unit 7, positioning arrangement 9, road information arrangement 11, processing unit 15, display unit 17, and/or any other arrangement, unit, system, device or module described herein may further comprise or be arranged or configured to cooperate with any type of storage device or storage arrangement known in the art, which may for example be used for storing input or output data associated with the functions and/or operations described herein. The handover notification arrangement 1, autonomous vehicle control arrangement 6, output unit 7, positioning arrangement 9, road information arrangement 11, processing unit 15, display unit 17, and/or any other arrangement, unit, system, device or module described herein may further comprise any computer hardware and software and/or electrical hardware known in the art configured to enable communication therebetween.

Figure 4:
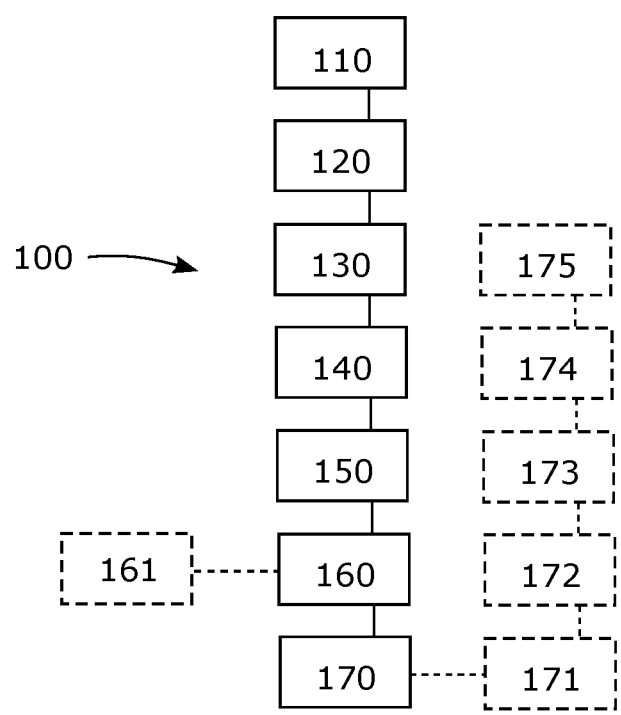
FIG. 4 illustrates a method of providing a handover notification.

FIG. 4 illustrates a method 100 of providing a handover notification in a driver environment of a vehicle having autonomous driving capabilities by means of an autonomous vehicle control arrangement, where the handover notification constitutes a notification concerning an upcoming handover from an autonomous driving mode to a manual driving mode of the vehicle, using a handover notification arrangement comprising an output unit configured to selectively provide the handover notification, a positioning arrangement, a road information arrangement and a processing unit, wherein the method 100 comprises:

provewing 110 map data representative of at least a road section in front of the vehicle and a current position of the vehicle, using the positioning arrangement, acquiring 120 road information representative of an upcoming road section at which the autonomous vehicle control arrangement is likely to become at least partially unable to perform the autonomous driving of the vehicle, and acquiring 130 road condition information representative of a road condition at the road section, using the road information arrangement, calculating 140 an estimated average speed on the road section based on the road condition information, using the processing unit, calculating 150 an estimated time available for autonomous driving based on the estimated average speed and a remaining distance from the current position of the vehicle to the upcoming road section, using the processing unit, calculating 160 an uncertainty estimate of the estimated time available for autonomous driving based on the estimated average speed such that the uncertainty estimate increases for low estimated average speeds, using the processing unit, causing 170 the output unit to provide the handover notification in dependence of the uncertainty estimate, such that the handover notification is provided earlier in cases of high uncertainty estimates than in cases of low uncertainty estimates, using the handover notification arrangement.

Optionally, the road condition information further comprises average speeds of vehicles travelling on the road section and speed limits at the road section, wherein the method 100 further comprises:

calculating 161 the uncertainty estimate based on a comparison between the average speeds of vehicles travelling on the road section, and speed limits at the road section, such that the uncertainty estimate increases for low average speeds of vehicles travelling on the road section, compared to speed limits at the road section, using the processing unit.

Optionally, the method 100 further comprises:

providing 171 the handover notification by outputting the estimated time available for autonomous driving, in case the uncertainty estimate is below a predetermined threshold value, and providing 172 the handover notification by outputting a static approximate time to reaching the upcoming road section based on the estimated time available for autonomous driving and the uncertainty estimate, in case the uncertainty estimate is above the predetermined threshold value, using the output unit.

Optionally, the method 100 further comprises:

providing 173 the handover notification by outputting the estimated time available for autonomous driving, in case the uncertainty estimate is below a predetermined threshold value, and providing 174 the handover notification by outputting the remaining distance to the upcoming road section, in case the uncertainty estimate is above the predetermined threshold value, using the output unit.

Optionally, the output unit comprises a display unit, and wherein the method 100 further comprises:

providing 175 the handover notification by performing a switch of displayed content on the display unit.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A handover notification arrangement configured to provide a handover notification in a driver environment of a vehicle having autonomous driving capabilities by means of an autonomous vehicle control arrangement, where the handover notification constitutes a notification concerning an upcoming handover from an autonomous driving mode to a manual driving mode of the vehicle, the handover notification arrangement comprising:

an output unit configured to selectively provide the handover notification;
a positioning arrangement configured to provide map data representative of at least a road section in front of the vehicle, and a current position of the vehicle;
a road information arrangement configured to acquire road information representative of an upcoming road section at which the autonomous vehicle control arrangement will become at least partially unable to perform autonomous driving of the vehicle, and configured to acquire road condition information representative of a road condition at the road section;
a processing unit configured to calculate an estimated average speed on the road section based on the road condition information, and further configured to calculate an estimated time available for autonomous driving based on the estimated average speed and a remaining distance from the current position of the vehicle to the upcoming road section;
wherein the processing unit further is configured to calculate an uncertainty estimate of the estimated time available for autonomous driving based on the estimated average speed, wherein the uncertainty estimate increases for estimated average speeds below a speed threshold, and where the handover notification arrangement is configured to cause the output unit to provide the handover notification in dependence of the uncertainty estimate, wherein the handover notification is provided earlier in response to uncertainty estimates above an uncertainty threshold than in response to uncertainty estimates below the uncertainty threshold.

2. The arrangement of claim 1 wherein the road condition information further comprises at least one of a level of congestion at the road section, average speeds of vehicles travelling on the road section, historic average speeds of vehicles having travelled on the road section and speed limits at the road section.

3. The arrangement of claim 1 wherein the road condition information further comprises average speeds of vehicles travelling on the road section and speed limits at the road section, wherein the processing unit further is configured to calculate the uncertainty estimate based on a comparison between the average speeds of vehicles travelling on the road section, and speed limits at the road section, wherein the uncertainty estimate increases for average speeds of vehicles travelling on the road section being below the speed limits at the road section, and wherein the uncertainty estimate decreases for average speeds of vehicles travelling on the road section being above the speed limits at the road section.

4. The arrangement of claim 1 wherein the output unit is configured to, in response to the uncertainty estimate being below a predetermined value, provide the handover notification by outputting the estimated time available for autonomous driving, and in response to the uncertainty estimate being above the predetermined value, provide the handover notification by outputting a static approximate time to reaching the upcoming road section based on the estimated time available for autonomous driving and the uncertainty estimate.

5. The arrangement of claim 1 wherein the output unit is configured to, in response to the uncertainty estimate being below a predetermined value, provide the handover notification by outputting the estimated time available for autonomous driving, and in response to the uncertainty estimate being above the predetermined value, provide the handover notification by outputting the remaining distance to the upcoming road section.

6. The arrangement of claim 1 wherein the output unit comprises a display unit configured to provide the handover notification by performing a switch of displayed content on the display unit.

7. A vehicle comprising a handover notification arrangement according to claim 1.

8. The arrangement of claim 1 wherein the road condition information comprises a weather condition and/or a light condition at the road section and the processing unit is configured to calculate the uncertainty estimate for the time available for autonomous driving wherein the uncertainty estimate increases in response to the weather and/or light condition having a value below an associated threshold, and decreases in response to the weather and/or light condition having a value above the associated threshold.

9. A method of providing a handover notification in a driver environment of a vehicle having autonomous driving capabilities by means of an autonomous vehicle control arrangement, where the handover notification constitutes a notification concerning an upcoming handover from an autonomous driving mode to a manual driving mode of the vehicle, using a handover notification arrangement comprising an output unit configured to selectively provide the handover notification, a positioning arrangement, a road information arrangement and a processing unit, the method comprising:
providing map data representative of at least a road section in front of the vehicle and a current position of the vehicle, using the positioning arrangement;
acquiring road information representative of an upcoming road section at which the autonomous vehicle control arrangement will become at least partially unable to perform the autonomous driving of the vehicle, using the road information unit;
acquiring road condition information representative of a road condition at the road section, using the road information arrangement;
calculating an estimated average speed on the road section based on the road condition information, using the processing unit;
calculating an estimated time available for autonomous driving based on the estimated average speed and a remaining distance from the current position of the vehicle to the upcoming road section, using the processing unit;
calculating an uncertainty estimate of the estimated time available for autonomous driving based on the estimated average speed wherein the uncertainty estimate increases for estimated average speeds below a speed threshold, using the processing unit; and
causing the output unit to provide the handover notification in dependence of the uncertainty estimate, wherein the handover notification is provided earlier in response to uncertainty estimates above an uncertainty threshold than in response to uncertainty estimates below the uncertainty threshold, using the handover notification arrangement.

10. The method of claim 9 wherein the road condition information further comprises average speeds of vehicles travelling on the road section and speed limits at the road section, wherein the method further comprises:
calculating, using the processing unit, the uncertainty estimate based on a comparison between the average speeds of vehicles travelling on the road section, and speed limits at the road section, wherein the uncertainty estimate increases for average speeds of vehicles travelling on the road section being below the speed limits at the road section, and wherein the uncertainty estimate decreases for average speeds of vehicles travelling on the road section being above the speed limits at the road section.

11. The method of claim 9 further comprising:
providing the handover notification by outputting the estimated time available for autonomous driving, in response to the uncertainty estimate being below a predetermined value, using the output unit; and
providing the handover notification by outputting a static approximate time to reaching the upcoming road section based on the estimated time available for autonomous driving and the uncertainty estimate, in in response to the uncertainty estimate being above the predetermined value, using the output unit.

12. The method of claim 9 further comprising:
providing the handover notification by outputting the estimated time available for autonomous driving, in response to the uncertainty estimate being below a predetermined value, using the output unit; and
providing the handover notification by outputting the remaining distance to the upcoming road section, in response to the uncertainty estimate being above the predetermined value, using the output unit.

13. The method of claim 9 wherein the output unit comprises a display unit, and wherein the method further comprises providing the handover notification by performing a switch of displayed content on the display unit.

14. The method of claim 9 wherein the road condition information comprises a weather condition and/or a light condition at the road section and the processing unit is configured to calculate the uncertainty estimate for the time available for autonomous driving wherein the uncertainty estimate increases in response to the weather and/or light condition having a value below an associated threshold, and decreases in response to the weather and/or light condition having a value above the associated threshold.

* * * * *

UNITED STATES PATENT AND TRADEMARK OFFICE
CERTIFICATE OF CORRECTION

PATENT NO. : 10,606,263 B2
APPLICATION NO. : 15/483181
DATED : March 31, 2020
INVENTOR(S) : Peter Harda et al.

Page 1 of 1

It is certified that error appears in the above-identified patent and that said Letters Patent is hereby corrected as shown below:

In the Claims

Column 17, Line 16, Claim 11:
After "and the uncertainty estimate, in"
Delete "in" (second occurrence).

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*